United States Patent
Okazaki

(10) Patent No.: US 8,551,579 B2
(45) Date of Patent: Oct. 8, 2013

(54) METHOD FOR PRODUCING CERAMIC HONEYCOMB STRUCTURE

(75) Inventor: Shunji Okazaki, Miyako-gun (JP)

(73) Assignee: Hitachi Metals, Ltd., Tokyo (JP)

( * ) Notice: Subject to any disclaimer, the term of this patent is extended or adjusted under 35 U.S.C. 154(b) by 1044 days.

(21) Appl. No.: 12/532,892

(22) PCT Filed: Feb. 28, 2008

(86) PCT No.: PCT/JP2008/053535
§ 371 (c)(1),
(2), (4) Date: Sep. 24, 2009

(87) PCT Pub. No.: WO2008/117621
PCT Pub. Date: Oct. 2, 2008

(65) Prior Publication Data
US 2010/0080930 A1  Apr. 1, 2010

(30) Foreign Application Priority Data
Mar. 28, 2007   (JP) .................... 2007-084703

(51) Int. Cl.
B29C 71/04 (2006.01)
B05D 3/02 (2006.01)
B05D 3/06 (2006.01)
B05D 1/38 (2006.01)

(52) U.S. Cl.
USPC ........... 427/541; 427/543; 427/591; 427/189; 427/201; 427/190; 427/202; 427/204; 427/205

(58) Field of Classification Search
None
See application file for complete search history.

(56) References Cited

U.S. PATENT DOCUMENTS

| | | | | | |
|---|---|---|---|---|---|
| 3,795,524 | A | * | 3/1974 | Sowman | 501/95.1 |
| 5,221,497 | A | * | 6/1993 | Watanabe et al. | 516/83 |
| 5,518,678 | A | * | 5/1996 | Miyamoto et al. | 264/177.12 |
| 5,629,067 | A | * | 5/1997 | Kotani et al. | 428/116 |
| 7,052,760 | B2 | * | 5/2006 | Hijikata | 428/116 |
| 7,687,008 | B2 | * | 3/2010 | Okazaki et al. | 264/442 |
| 7,892,309 | B2 | * | 2/2011 | Okazaki et al. | 55/523 |
| 8,398,797 | B2 | * | 3/2013 | Okazaki | 156/89.22 |
| 8,449,645 | B2 | * | 5/2013 | Okazaki | 55/523 |
| 2004/0076794 | A1 | * | 4/2004 | Hijikata | 428/116 |

(Continued)

FOREIGN PATENT DOCUMENTS

| | | |
|---|---|---|
| CN | 1747909 A | 3/2006 |
| JP | 05-269388 A | 10/1993 |

(Continued)

OTHER PUBLICATIONS

Machine translation of JP 2006-298745 A, by Kato Shigeki, published Nov. 2, 2006.*

(Continued)

Primary Examiner — Marianne L Padgett
(74) Attorney, Agent, or Firm — Sughrue Mion, PLLC

(57) ABSTRACT

A method for producing a ceramic honeycomb structure comprising a ceramic honeycomb body having large numbers of longitudinally extending cells defined by cell walls, and an outer peripheral wall formed on an outer peripheral surface of the ceramic honeycomb body, comprising the steps of applying a coating material comprising colloidal silica having an average particle size of 4-150 nm to longitudinally extending grooves defined by cell walls on the outer peripheral surface of the ceramic honeycomb body, and induction-drying the coating material to form the outer peripheral wall.

6 Claims, 1 Drawing Sheet

(56) References Cited

U.S. PATENT DOCUMENTS

| | | |
|---|---|---|
| 2005/0159308 A1 | 7/2005 | Bliss et al. |
| 2006/0192326 A1 | 8/2006 | Matsunaga et al. |
| 2006/0210764 A1 | 9/2006 | Yamada et al. |
| 2010/0009117 A1 | 1/2010 | Okazaki |
| 2010/0151185 A1* | 6/2010 | Okazaki ............ 428/116 |
| 2012/0317947 A1* | 12/2012 | Okazaki ............ 55/523 |
| 2013/0019579 A1* | 1/2013 | Okazaki et al. ........ 55/523 |

FOREIGN PATENT DOCUMENTS

| | | |
|---|---|---|
| JP | 2002-234780 A * | 8/2002 |
| JP | 2005-131800 A | 5/2005 |
| JP | 2006-255542 A | 9/2006 |
| JP | 2006-298745 A | 11/2006 |
| WO | 2005/065199 A2 | 7/2005 |

OTHER PUBLICATIONS

Machine translation of JP 2005-131800 A, by Shunji Okazaki, published May 26, 2005.*

Machine translation of JP 05-269388 A, by Kotani Wataru et al., published Oct. 19, 1993.*

Chinese Office Action issued in Application No. 200880010117.0 dated Jul. 26, 2012.

* cited by examiner

METHOD FOR PRODUCING CERAMIC HONEYCOMB STRUCTURE

CROSS REFERENCE TO RELATED APPLICATION

This application is a National Stage of International Application No. PCT/JP2008/053535 filed Feb. 28, 2008, claiming priority based on Japanese Patent Application No. 2007-084703, filed Mar. 28, 2007, the contents of all of which are incorporated herein by reference in their entirety.

FIELD OF THE INVENTION

The present invention relates to a method for producing a ceramic honeycomb structure used for exhaust-gas-cleaning catalytic converters and particulate-matter-capturing filters.

BACKGROUND OF THE INVENTION

To protect regional and global environment, exhaust-gas-cleaning catalytic converters and particulate-matter-capturing filters comprising ceramic honeycomb structures are used to reduce harmful substance contained in exhaust gases discharged from engines of automobiles, etc.

As shown in FIG. 2, a conventional ceramic honeycomb structure 20 comprises large numbers of flow paths 24 formed by perpendicularly crossing cell walls 23 and an outer peripheral wall 21, and its cross section shape perpendicular to the flow paths is usually substantially circular or elliptical. The outer peripheral wall 21 of the ceramic honeycomb structure 20 is held by a grip member (not shown) formed by a metal mesh, a ceramic mat, etc. in a metal container (not shown) to prevent the ceramic honeycomb structure 20 from moving during driving.

The ceramic honeycomb structure 20 is produced by the steps of (1) mixing and blending starting materials comprising a ceramic material such as cordierite powder, a molding aid, a pore-forming material, etc. with water to prepare a moldable ceramic material, (2) extruding the moldable ceramic material through a honeycomb-shaped die to form a green ceramic honeycomb body having a honeycomb structure integrally comprising an outer peripheral wall 21 and cell walls 23, and (3) drying and sintering the green body. Such steps produce a ceramic honeycomb structure 20 having predetermined shape and strength with cell walls 23 having fine pores.

Filters for cleaning exhaust gases discharged from diesel engines may use large ceramic honeycomb structures 20 having outer diameters D of 150 mm or more and length L of 150 mm or more, with cell walls 23 as thin as 0.2 mm or less, as shown in FIG. 2. In the production of such a large ceramic honeycomb structure 20 with thin cell walls, a green ceramic honeycomb body obtained from the moldable ceramic material by extrusion has such insufficient strength that it may be deformed in an outer peripheral wall 21 by its own weight, resulting in crushed cell walls 23. The sintering of a deformed green body would not provide a ceramic honeycomb structure 20 having desired strength.

To solve this problem, as shown in FIGS. 1(a) and 1(b), JP 5-269388 A discloses a honeycomb structure 10 comprising an outer peripheral wall 12 bonded to a ceramic honeycomb body 11, the outer peripheral wall 12 being formed by filling grooves 15 of cells 14a on an outer peripheral surface among large numbers of cells 14 defined by cell walls 13 with a coating material 12c comprising cordierite particles and/or ceramic fibers and colloidal oxide (colloidal silica, colloidal alumina, etc.) as main components, and drying or sintering it. JP 5-269388 A describes in Examples that the applied coating material 12c was left to stand for 24 hours in the air, and then dried at 90° C. for 2 hours to form the outer peripheral wall 12.

However, a drying method by heating from outside as described in JP 5-269388 A heats a surface portion 12s of the coating material 12c first, heat being gradually conveyed to the inside 12n. Accordingly, the surface portion 12s of the coating material 12c is first dried, and water then moves from the inside 12n to the surface and evaporates from the already dried surface portion 12s, so that the inside 12n is then dried. Accordingly, there is difference in a water content between the surface portion 12s and inside 12n of the coating material 12c during drying, and the resultant drying shrinkage difference is likely to generate cracks 16 on the coating material surface 12s. Particularly when the outer peripheral wall is thick, or when the heating temperature is high to shorten the drying time, there is larger temperature difference, resulting in more likelihood of generating cracks 16.

Like JP 5-269388 A, JP 2006-298745 A discloses a ceramic honeycomb structure 10 coated with a coating material 12c on a peripheral surface shown in FIG. 1. This reference describes that the coating material 12c is formed by a slurry comprising crushed porcelain having a particle size of 15-75 μm with a water content of 26-34% by mass, and resistant to cracking even by forced drying (drying with far-infrared rays and/or hot air), resulting in reduced production time.

However, particularly when a large ceramic honeycomb structure having an outer diameter D of 150 mm or more and a length L of 150 mm or more used for diesel engines, etc. is produced, forced drying using far-infrared rays and/or hot air would be difficult to uniformly dry the outer peripheral wall 12 even though a coating material slurry comprising the crushed porcelain described in JP 2006-298745 A were used, resulting in partially uneven drying. As a result, the outer peripheral wall 12 is provided with densified portions and less densified portions, making it likely that the low-strength, outer peripheral wall is cracked by small shock during handling.

OBJECT OF THE INVENTION

Accordingly, an object of the present invention is to provide a method for producing a ceramic honeycomb structure while suppressing cracking when a coated coating material is dried in the formation of an outer peripheral wall on a ceramic honeycomb structure having large numbers of cells, thereby avoiding the reduction of the strength of the outer peripheral wall.

DISCLOSURE OF THE INVENTION

As a result of intensive research in view of the above object, the inventors have found that by induction-drying a coating material comprising colloidal silica, which is coated as an outer-peripheral-wall-forming material, uniformly with a controlled speed, cracking is suppressed during drying, thereby providing the outer peripheral wall with high strength. The present invention has been completed based on such finding.

Thus, the method of the present invention for producing a ceramic honeycomb structure having a ceramic honeycomb body having large numbers of longitudinally extending cells defined by cell walls, and an outer peripheral wall formed on an outer peripheral surface of the ceramic honeycomb body, comprises the steps of applying a coating material comprising colloidal silica having an average particle size of 4-150 nm to longitudinally extending grooves defined by cell walls on the outer peripheral surface of the ceramic honeycomb body, and induction-drying the coating material to form the outer peripheral wall.

The coating material preferably comprises ceramic particles having an average particle size of 8-40 μm. The thickness of the outer peripheral wall is preferably 0.5 mm or more.

Electromagnetic waves used for the induction drying are preferably microwaves or RF (radio frequency) waves. The induction drying is preferably conducted in a humid atmosphere.

The induction-dried outer peripheral wall is preferably further coated with colloidal silica having an average particle size of 4-150 nm.

DESCRIPTION OF THE PREFERRED EMBODIMENTS

[1] Ceramic Honeycomb Structure

Figure 1A:
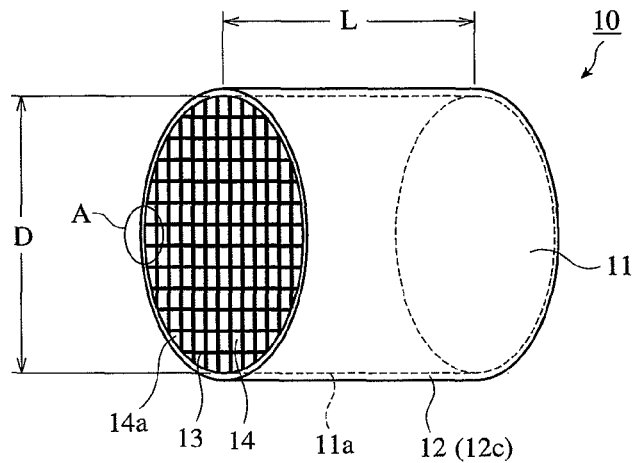
FIG. 1(a) is a perspective view showing one example of the ceramic honeycomb structures of the present invention.

The ceramic honeycomb structure of the present invention comprises a ceramic honeycomb body having large numbers of longitudinally extending cells defined by cell walls, and an outer peripheral wall formed on an outer peripheral surface of the ceramic honeycomb body, the outer peripheral wall being formed by applying a coating material comprising colloidal silica having an average particle size of 4-150 nm to longitudinally extending grooves defined by cells on an outer peripheral surface of the ceramic, and induction-drying the coating material.

The induction drying is a drying method of irradiating the coating material with electromagnetic waves such as microwaves, etc. to cause the vibration and rotation of the electric dipoles of water molecules therein, thereby directly heating the coating material. Because this method can directly heat water molecules, it has a higher drying speed inside the coating material than conduction heating, so that it can evaporate water substantially uniformly without uneven drying. The colloidal silica having an average particle size of 4-150 nm in the coating material functions as a binder, densifying a dried outer peripheral wall by the interaction of colloid particles with ceramic particles, aggregates in the coating material. The uniform drying of the coating material by induction drying causes uniform densification, thereby surely providing a strong outer peripheral wall without surface cracking.

The colloidal silica comprises colloid particles and a liquid component. The average particle size of the colloidal silica means that of the colloid particles. When the colloidal silica has an average particle size of less than 4 nm, it has too high bonding strength with ceramic particles, aggregates of the coating material, providing the dried outer peripheral wall with too high strength and thus low thermal shock resistance. When the colloidal silica has an average particle size exceeding 150 nm, it has too low bonding strength with ceramic particles, aggregates of the coating material, providing the dried outer peripheral wall with insufficient densification, and thus too low strength. The average particle size of the colloidal silica is preferably 10-100 nm.

The coating material preferably comprises ceramic particles having an average particle size of 8-40 μm. Such ceramic particles make the shrinkage of the coating material smaller during drying, making the coating material surface resistant to cracking, and increasing the bonding of ceramic particles to colloidal silica to accelerate densification, thereby surely providing a strong coating. When the ceramic particles have an average particle size of less than 8 μm, there is too high bonding between the ceramic particles and colloidal silica, resulting in too strong an outer peripheral wall with reduced thermal shock resistance. When the average particle size of the ceramic particles exceeds 40 μm, there is too low bonding between the ceramic particles and colloidal silica, providing the outer peripheral wall with reduced strength. The average particle size of the ceramic particles is preferably 15-25 μm. The ceramic particles are preferably at least one selected from the group consisting of cordierite, alumina, mullite, silica, silicon carbide, titania, and aluminum titanate.

The thickness of the outer peripheral wall is preferably 0.5 mm or more. When the thickness t of the outer peripheral wall is less than 0.5 mm, the dried outer peripheral wall does not have sufficient strength. When the thickness of the outer peripheral wall exceeds 6 mm, the outer peripheral wall is likely to have low thermal shock resistance. Accordingly, the thickness of the outer peripheral wall is preferably 6 mm or less. If the thickness of the outer peripheral wall varied longitudinally along the ceramic honeycomb structure, a drying speed would differ between thick portions and thin portions, making it likely to have cracks on the coating surface. Accordingly, the thickness variation of the outer peripheral wall is preferably within 35% of the average thickness of the outer peripheral wall.

Electromagnetic waves used for induction drying are preferably microwaves or RF (radio-frequency) waves. The use of microwaves or RF waves as an energy source can efficiently heat water molecules in the coating material, thereby quickly evaporating water from the coating material with substantial uniformity.

Induction drying is conducted preferably in a humid atmosphere. Induction can dry the coating material from surface and inside substantially uniformly, but it is difficult to prevent a very surface of the coating material from drying. The drying of a very surface of the coating material can be prevented by induction drying in a humid atmosphere, thereby further suppressing cracking. The induction drying is conducted in an atmosphere of preferably 50% RH or more, more preferably 70% RH or more. Although moistening may be conducted in an entire period between the start and end of induction drying, moistening in 60% or more of the drying time can effectively prevent cracking. At less than 50% HR, cracking is unlikely prevented on the dried outer peripheral surface sufficiently.

The induction-dried outer peripheral wall is preferably further coated with colloidal silica having an average particle size of 4-150 nm. The further coating of colloidal silica makes colloid particles penetrate into the outer peripheral wall, thereby further densifying and strengthening the outer peripheral wall.

[2] Embodiments

Figure 1B:
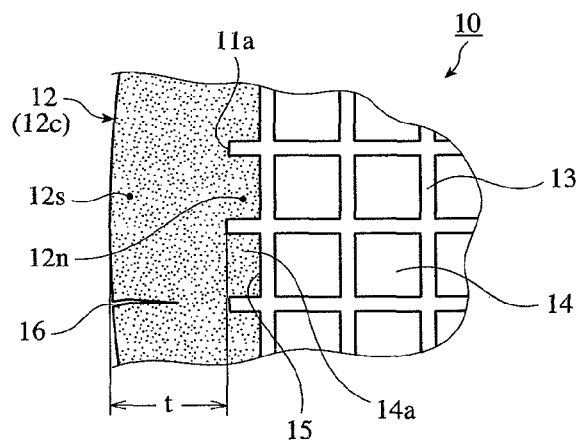
FIG. 1(b) is an enlarged cross-sectional view showing a portion A in FIG. 1(a).
Figure 2:
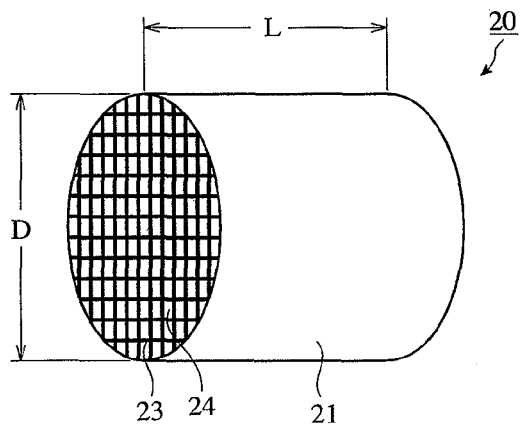
FIG. 2) is a perspective view showing one example of conventional ceramic honeycomb structures.

FIG. 1 shows one example of the ceramic honeycomb structures of the present invention. The ceramic honeycomb structure 10 shown in FIG. 1 comprises a ceramic honeycomb body 11 having large numbers of longitudinally extending cells 14 defined by cell walls 13, and an outer peripheral wall 12 formed by applying a coating material 12c to longitudinally extending grooves 15 defined by cells 14 on an outer peripheral surface of the ceramic honeycomb body 11. The ceramic honeycomb structure 10 has, for instance, an outer diameter D of 280 mm, a length L of 300 mm, a thickness of 0.2 mm in cell walls 13, and cell pitch of 1.5 mm. The outer peripheral wall 12 is formed by removing a peripheral portion (not shown) of the ceramic honeycomb body 11 by machining and applying a coating material 12c to the resultant outer peripheral portion 11a. The cell walls 13 are preferably made of cordierite, and cordierite-forming material powder comprising 48-52% by mass of $SiO_2$, 33-37% by mass of $Al_2O_3$, and 12-15% by mass of MgO is preferably used. The coating material 12c preferably comprises cordierite particles having an average particle size of about 30 μm and colloidal silica having an average particle size of 4-150 nm.

The present invention will be explained in further detail by Examples below without intention of restricting the present invention thereto.

EXAMPLE 1

Kaolin powder, talc powder, silica powder and alumina powder were mixed to prepare cordierite-forming material powder comprising 50% by mass of $SiO_2$, 35% by mass of $Al_2O_3$ and 13% by mass of MgO, to which methylcellulose and hydroxypropyl methylcellulose as binders, a lubricant, and graphite as a pore-forming material were added. After thorough dry-blending, sufficient blending was conducted with water added to prepare a plasticized moldable ceramic material. This moldable ceramic material was extrusion-molded, and cut to a predetermined length to obtain a green body having a honeycomb structure integrally comprising a peripheral portion and cell walls. The peripheral portion was removed from this green body by machining to form an outer peripheral portion 11a, and drying and sintering the green body to obtain a cordierite ceramic honeycomb structure 10 having an outer diameter D of 280 mm, an entire length L of 300 mm, a cell wall thickness of 0.3 mm and a cell pitch of 1.5 mm as shown in FIG. 1.

Ceramic particles comprising cordierite having an average particle size of 21 μm were mixed with 20% by mass, based on the ceramic particles, of colloidal silica having an average particle size of 4 nm as a binder, an organic binder and water to prepare a paste-like coating material (water content: about 30% by mass) coatable onto a sintered honeycomb body. This coating material was coated onto the outer peripheral portion 11a of the ceramic honeycomb body 11, and then dried by a microwave drier (power: 30 kW) for 0.5 hours. The microwave drier comprises a drying chamber for containing pluralities of green bodies, a microwave generator for supplying microwaves into this drying chamber, and a moistening apparatus for keeping an atmosphere in the drying chamber humid. The moistening apparatus comprises a pipe extending from a boiler and open in the drying chamber, and steam ejected through the pipe can control an atmosphere in the drying chamber at 80° C. or higher and 60% RH or more. In Example 1, microwave drying was conducted without moistening. After drying, the outer peripheral wall was as thick as 2.0 mm.

EXAMPLE 2

A cordierite ceramic honeycomb structure was produced, and a coating material was coated and dried, in the same manner as in Example 1 except that a coating material (water content: about 30% by mass) was produced using colloidal silica having an average particle size of 20 nm in place of colloidal silica having an average particle size of 4 nm, and that drying was conducted for 0.5 hours using a RF (radio frequency) drier in place of a microwave drier.

EXAMPLES 3-6

Cordierite ceramic honeycomb structures were produced, and coating materials were coated and dried, in the same manner as in Example 1 except for changing the colloidal silica and the drying conditions as shown in Table 1.

EXAMPLE 7

A cordierite ceramic honeycomb structure was produced in the same manner as in Example 6 except for using silica having an average particle size of 21 μm in place of cordierite as ceramic particles, and a coating material was coated, and dried for 0.5 hours by irradiating microwaves (power: 30 kW) while keeping an atmosphere in the apparatus at 60% RH.

EXAMPLES 8 and 9

A cordierite ceramic honeycomb structure was produced, and a coating material was coated and dried in the same manner as in Example 7 except for changing humidity in the apparatus as shown in Table 1 during microwave drying.

EXAMPLE 10

A coating material prepared in the same manner as in Example 8 was coated onto an outer peripheral wall of a ceramic honeycomb structure and dried, and colloidal silica having an average particle size of 100 nm was further coated to a dry thickness of 0.1 mm. The resultant coating was dried by microwaves (power: 30 kW) for 0.2 hours while moistening to 70% RH.

EXAMPLES 11-15 AND COMPARATIVE EXAMPLES 1-7

Cordierite ceramic honeycomb structures were produced, and coating materials were coated and dried, in the same manner as in Example 1 except for changing the ceramic particles, the colloidal silica, the thickness of the outer peripheral wall and the drying conditions as shown in Table 1. In Comparative Example 4, the coating material was dried by far-infrared rays (atmosphere temperature: 80° C.) for 1 hour. In Comparative Example 5, the coating material was dried by heating with hot air at 90° C. for 2 hours. In Comparative Example 6, the coating material was dried in the air (20° C.) for 48 hours. In Comparative Example 7, the coating material was dried in the air (20° C.) for 24 hours, and then by heating with hot air at 90° C. for 2 hours.

The dried ceramic honeycomb structure 10, onto which each of the coating materials of Examples 1-15 and Comparative Examples 1-7 was coated, was subjected to the evaluation of cracking by the drying of the coating material, an isostatic strength test and a thermal shock resistance test by the following methods.

Evaluation of Cracking by Drying of Coating Material

Cracking by the drying of the coating material was evaluated by observing the outer peripheral wall after drying the coating material by the naked eye. Three samples were used in each of Examples and Comparative Examples, and evaluated by the following standard.

Excellent No Cracking in any of Three Samples.

Good At least one of three samples had cracks of less than 3 mm.

Fair At least one of three samples had cracks of 3 mm or more and less than 5 mm.

Poor At least one of three samples had cracks of 5 mm or more.

Isostatic Strength Test

The isostatic strength test was conducted according to the JASO standard M505-87 of the Society of Automotive Engineers of Japan. A ceramic honeycomb structure having both longitudinal ends sealed with 20-mm-thick aluminum plates and an outer wall sealed with a 2-mm-thic rubber was placed in a pressure container, into which water was introduced to exert isostatic pressure to the outer wall surface. Pressure causing breakage was measured as the isostatic strength. The evaluation of the isostatic strength was conducted by the following standard.

Good No breakage occurred even at pressure of 2 MPa (having sufficient strength).

Fair No breakage occurred even at pressure of 1.5 MPa (usable in practical applications).

Poor Breakage occurred at pressure of less than 1.5 MPa (unusable in practical applications).

Thermal Shock Resistance Test

The thermal shock resistance test was conducted by heating the honeycomb structure 10 at 500° C. for 30 minutes in an electric furnace, and then rapidly cooling it to room temperature to observe cracks by the naked eye. When no cracks were found, the same test was conducted with the electric furnace temperature elevated by 25° C., and this operation was repeated until cracking occurred. Each sample was tested three times to determine the difference between a temperature at which cracking occurred in at least one honeycomb structure and room temperature (heating temperature-room temperature) as a thermal shock resistance temperature, which was evaluated by the flowing standard.

Excellent The thermal shock resistance temperature was 650° C. or higher.

Good The thermal shock resistance temperature was 600° C. or higher and lower than 650° C.

Fair The thermal shock resistance temperature was 550° C. or higher and lower than 600° C.

Poor The thermal shock resistance temperature was lower than 550° C.

The total evaluation was determined by cracking, isostatic strength and thermal shock resistance.

Excellent At least one of them was evaluated as Excellent.

Good Two or more of them were evaluated as Good.

Fair Two or more of them were evaluated as Fair.

Poor At least one of them was evaluated as Poor.

The results are shown in Table 1.

TABLE 1

| No. | Ceramic Particles Type | Ceramic Particles Average Particle Size (μm) | Colloidal Silica Average Particle Size (nm) | Thickness of Outer Peripheral Wall (mm) |
|---|---|---|---|---|
| Example 1 | Cordierite | 21 | 4 | 2.0 |
| Example 2 | Cordierite | 21 | 20 | 2.0 |
| Example 3 | Cordierite | 21 | 50 | 2.0 |
| Example 4 | Cordierite | 21 | 50 | 2.0 |
| Example 5 | Cordierite | 21 | 80 | 2.0 |
| Example 6 | Cordierite | 21 | 100 | 2.0 |
| Example 7 | Silica | 21 | 100 | 2.0 |
| Example 8 | Silica | 21 | 100 | 2.0 |
| Example 9 | Silica | 21 | 100 | 2.0 |
| Example 10[(1)] | Silica | 21 | 100 | 2.0 |
| Example 11 | Silica | 21 | 150 | 2.0 |
| Example 12 | Silica | 45 | 100 | 2.0 |
| Example 13 | Silica | 7 | 100 | 2.0 |
| Example 14 | Silica | 7 | 100 | 0.1 |
| Example 15 | Silica | 7 | 100 | 8.0 |
| Comparative Example 1 | Cordierite | 21 | 3 | 2.0 |
| Comparative Example 2 | Cordierite | 21 | 170 | 2.0 |
| Comparative Example 3 | Cordierite | 21 | 300 | 2.0 |
| Comparative Example 4 | Crushed Porcelain | 50 | 45 | 0.75 |
| Comparative Example 5 | Cordierite | 21 | 100 | 2.0 |
| Comparative Example 6 | Cordierite | 21 | 100 | 2.0 |
| Comparative Example 7 | Cordierite | 21 | 100 | 2.0 |

| No. | Drying Conditions Drying Method | Drying Conditions Hours | Evaluation Results Cracking | Evaluation Results Isostatic Strength | Evaluation Results Thermal Shock Resistance | Total Evaluation |
|---|---|---|---|---|---|---|
| Example 1 | Microwave | 0.5 | Good | Good | Fair | Good |
| Example 2 | RF | 0.5 | Good | Fair | Good | Good |
| Example 3 | Microwave | 0.3 | Good | Fair | Good | Good |
| Example 4 | Microwave | 0.5 | Good | Fair | Good | Good |
| Example 5 | RF | 0.5 | Good | Fair | Good | Good |
| Example 6 | Microwave | 0.5 | Good | Fair | Good | Good |

TABLE 1-continued

| Example | Method | Time | | | | |
|---|---|---|---|---|---|---|
| Example 7 | Microwave + Moistening to 60% RH | 0.5 | Good | Fair | Good | Good |
| Example 8 | Microwave + Moistening to 70% RH | 0.5 | Excellent | Fair | Good | Excellent |
| Example 9 | Microwave + Moistening to 80% RH | 0.5 | Excellent | Good | Good | Excellent |
| Example 10[(1)] | Microwave + Moistening to 70% RH | 0.5 | Excellent | Excellent | Excellent | Excellent |
| Example 11 | Microwave | 0.5 | Good | Fair | Good | Good |
| Example 12 | Microwave | 0.5 | Good | Fair | Good | Good |
| Example 13 | Microwave | 0.5 | Good | Good | Good | Good |
| Example 14 | Microwave | 0.5 | Good | Fair | Good | Good |
| Example 15 | Microwave | 0.5 | Good | Excellent | Good | Excellent |
| Comparative Example 1 | Microwave | 0.5 | Good | Good | Poor | Poor |
| Comparative Example 2 | Microwave | 0.5 | Good | Poor | Good | Poor |
| Comparative Example 3 | Microwave | 0.5 | Good | Poor | Good | Poor |
| Comparative Example 4 | Far infrared rays at 80° C. | 1.0 | Fair | Fair | Poor | Poor |
| Comparative Example 5 | Hot-air-drying at 90° C. | 2.0 | Poor | Fair | Fair | Poor |
| Comparative Example 6 | Spontaneous drying at 20° C. | 48 | Good | Poor | Poor | Poor |
| Comparative Example 7 | Spontaneous drying at 20° C. + hot-air-drying at 90° C. | 24 + 2.0 | Poor | Poor | Fair | Poor |

Note:
[(1)]After the coating material was coated and dried, colloidal silica having an average particle size of 100 nm was coated and dried.

As is clear from Table 1, each ceramic honeycomb structure 10 of Examples 1-15 suffered substantially no cracking when dried after applying the coating material 12c, resulting in sufficient strength in an outer peripheral wall 12 and excellent thermal shock resistance. It is thus considered that cracking due to heat shock is prevented when used for catalytic converters and filters, and the outer peripheral wall is resistant to cracking by small shock during handling. Particularly in Examples 8 and 9, in which microwave drying was conducted with moistening to 70% RH or more, a very surface of the coating material was effectively prevented from drying, so that cracks 16 were not generated at all during drying. In Example 10 in which colloidal silica was further coated, the outer peripheral wall had improved strength presumably because its surface was further densified.

The ceramic honeycomb structure of Comparative Example 1 had poor thermal shock resistance because colloidal silica had too small an average particle size, and the ceramic honeycomb structures of Comparative Examples 2 and 3 had insufficient strength in their outer peripheral walls 12 because colloidal silica had too large an average particle size. The ceramic honeycomb structure of Comparative Example 4 dried by far-infrared rays had poor thermal shock resistance. The ceramic honeycomb structure of Comparative Example 5 dried by hot air at 90° C. had many cracks. The ceramic honeycomb structure of Comparative Example 6 dried only spontaneously was free from cracking, but had insufficient strength and poor thermal shock resistance because of insufficient drying. The ceramic honeycomb structure of Comparative Example 7 dried spontaneously and by heating had many cracks and insufficient strength.

EFFECT OF THE INVENTION

Because the production method of the present invention suppresses the cracking of a coating during drying, it can provide ceramic honeycomb structures with no cracking due to heat shock when used for catalytic converters and filters. In addition, because the strength of an outer peripheral wall can be increased, it is possible to provide a ceramic honeycomb structure having an outer peripheral wall that does not suffer cracking by small shock during handling.

What is claimed is:

1. A method for producing a ceramic honeycomb structure comprising a ceramic honeycomb body having longitudinally extending cells defined by cell walls, and an outer peripheral wall formed on an outer peripheral surface of said ceramic honeycomb body, comprising the steps of applying a coating material comprising colloidal silica having an average particle size of 50-150 nm and ceramic particles havin an average particle size of 8-40 μm and selected from the group consisting of cordierite and silica to longitudinally extending grooves defined by cell walls on the outer peripheral surface of the ceramic honeycomb body, and induction-drying said coating material to form said outer peripheral wall.

2. The method for producing a ceramic honeycomb structure according to claim 1, wherein said outer peripheral wall has a thickness of 0.5 mm or more.

3. The method for producing a ceramic honeycomb structure according to claim 1, wherein electromagnetic waves used for the induction drying are microwaves or RF (radio frequency) waves.

4. The method for producing a ceramic honeycomb structure according to claim 1, wherein said induction drying is conducted in an atmosphere of 50% RH or more.

5. The method for producing a ceramic honeycomb structure according to claim 1, wherein the induction-dried outer peripheral wall is further coated with colloidal silica having an average particle size of 100-150 nm.

6. A method for producing a ceramic honeycomb structure comprising a ceramic honeycomb body having longitudinally extending cells defined by cell walls, and an outer peripheral wall formed on an outer peripheral surface of said ceramic honeycomb body, comprising the steps of applying a coating material comprising colloidal silica having an average particle size of 4-150 nm and ceramic particles having an average particle size of 8-40 μm and selected from the group consisting of cordierite and silica to longitudinally extending grooves defined by cell walls on the outer peripheral surface of the ceramic honeycomb body, and induction-drying said coating material to form said outer peripheral wall, wherein said outer peripheral wall is uniformly dried to provide a uniformly densified wall.

\* \* \* \* \*